(12) United States Patent
Kurita et al.

(10) Patent No.: US 7,516,701 B2
(45) Date of Patent: Apr. 14, 2009

(54) GAS GENERATOR

(75) Inventors: Kazumasa Kurita, Himeji (JP); Kenjiro Ikeda, Himeji (JP); Akihiko Tanaka, Himeji (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 163 days.

(21) Appl. No.: 10/594,518

(22) PCT Filed: Mar. 29, 2005

(86) PCT No.: PCT/JP2005/005892

§ 371 (c)(1),
(2), (4) Date: Sep. 28, 2006

(87) PCT Pub. No.: WO2005/095162

PCT Pub. Date: Oct. 13, 2005

(65) Prior Publication Data

US 2007/0186797 A1   Aug. 16, 2007

(30) Foreign Application Priority Data

Mar. 30, 2004  (JP) .............................. 2004-098321

(51) Int. Cl.
*C06D 5/06* (2006.01)
*C06D 5/00* (2006.01)
*B60R 21/26* (2006.01)

(52) U.S. Cl. .................. 102/530; 102/531; 280/736; 280/740

(58) Field of Classification Search .............. 102/530, 102/531; 280/736, 740, 741
See application file for complete search history.

(56) References Cited

U.S. PATENT DOCUMENTS

| 3,986,456 | A | * | 10/1976 | Doin et al. ................... 102/531 |
| 5,204,068 | A | * | 4/1993 | O'Loughlin et al. ......... 422/180 |
| 5,951,040 | A | * | 9/1999 | McFarland et al. ........... 280/736 |
| 5,984,352 | A | * | 11/1999 | Green et al. ................. 280/736 |
| 6,290,256 | B1 | * | 9/2001 | McFarland et al. ........... 280/736 |
| 6,406,060 | B1 | | 6/2002 | Katsuda et al. |
| 6,830,264 | B2 | * | 12/2004 | Al-Amin ..................... 280/736 |
| 6,854,395 | B2 | * | 2/2005 | Katsuda et al. ............. 102/530 |
| 6,983,679 | B2 | * | 1/2006 | Dittrich et al. ............. 89/35.01 |

(Continued)

FOREIGN PATENT DOCUMENTS

DE    44 44 775 A1    6/1996

(Continued)

*Primary Examiner*—Bret Hayes
(74) *Attorney, Agent, or Firm*—Oblon, Spivak, McClelland, Maier & Neustadt, P.C.

(57) ABSTRACT

A gas generator, including an igniter, a gas generating agent ignited by the igniter and generating gas by burning, and a holder and an AC cup forming therein a gas generating agent storage chamber filled with the gas generating agent. A housing formed of the holder and the AC cup is vertically held and fixed by a pair of plate-like members arranged parallel with each other. The gas generator also includes projections forming deformable areas which are deformed in a direction for decreasing the vertical outside dimensions of the gas generator when the housing is fixed by the pair of plate-like members. Thus, when the gas generator is fixed by the pair of plate-like members in the vertical direction, the dispersion of the outside dimensions of the gas generator can be absorbed.

15 Claims, 6 Drawing Sheets

U.S. PATENT DOCUMENTS

| | | | |
|---|---|---|---|
| 2003/0051630 A1* | 3/2003 | Katsuda et al. | 102/531 |
| 2003/0070574 A1* | 4/2003 | Rink et al. | 102/530 |
| 2003/0116052 A1* | 6/2003 | Fogle, Jr. | 102/530 |
| 2003/0121578 A1* | 7/2003 | Parkinson et al. | 149/73 |
| 2005/0017496 A1 | 1/2005 | Stevens et al. | 280/806 |

FOREIGN PATENT DOCUMENTS

| | | |
|---|---|---|
| DE | 196 43 402 A1 | 4/1998 |
| DE | 198 12 221 A1 | 9/1998 |
| DE | 198 26 305 A1 | 12/1998 |
| DE | 199 61 110 A1 | 6/2001 |
| DE | 19961109 | 6/2001 |
| JP | 09-202213 | 8/1997 |
| JP | 11-129867 | 5/1999 |
| JP | 2001-233167 | 8/2001 |
| JP | 2002-274315 | 9/2002 |
| JP | 2002-321596 | 11/2002 |

* cited by examiner

GAS GENERATOR

TECHNICAL FIELD

The present invention relates to a gas generator generating gas by burning a gas generating agent, and more particularly, it relates to a gas generator held and fixed by a pair of platelike members when assembled into a unit.

BACKGROUND ART

In general, a seat belt apparatus and an air bag apparatus are widespread in view of protection of a rider of an automobile. The seat belt apparatus is equipped in order to prevent the rider from being thrown from his/her seat in the automobile due to an impact resulting from a collision of the vehicle, and binds/fastens the rider to the seat by lapping a belt around the body of the rider.

In recent years, a seat belt apparatus having a pretensioner function for improving a rider protecting function has rapidly become widespread. According to this pretensioner function, the seat belt loosened due to the thickness of clothes or the like is instantaneously wound up upon a collision or immediately before the collision, in order to improve an effect of binding the rider. This pretensioner function is implemented by strongly winding up the seat belt with a gas pressure output from a gas generator referred to as a micro gas generator.

In relation to a seat belt windup drive unit provided with this gas generator, various mechanisms are known. A seat belt windup drive unit formed by annularly coiling a metal belt coupled to a shaft winding up a seat belt and holding the metal belt with a pair of platelike members to block a hollow part of the annularly coiled metal belt while arranging a gas generator in a space defined by the metal belt and the pair of platelike members is known as one of such mechanisms (refer to specification of German Patent Publication No. 19961109 (Patent Document 1)).

In the seat belt windup drive unit disclosed in the aforementioned Patent Document 1, the pressure in the space defined by the metal belt and the pair of platelike members rises due to gas output from the gas generator to expand the metal belt outward, thereby rotating the shaft by a prescribed quantity and winding up the seat belt.

Patent Document 1: Specification of German Patent Publication No. 19961109

DISCLOSURE OF THE INVENTION

Problem to be Solved by the Invention

In the seat belt windup drive unit disclosed in the aforementioned Patent Document 1, it is important to ensure airtightness in the space defined by the metal belt and the pair of platelike members. If this airtightness is not sufficiently ensured, the gas escapes from gaps between the metal belt and the platelike members, the gas pressure for expanding the metal belt is rendered deficient, and the seat belt is insufficiently wound up.

Dispersion in the outside dimension of a housing of the gas generator can be listed as a factor inhibiting the airtightness of the aforementioned space. In order to simplify an assembling operation, the gas generator is vertically held and fixed by the pair of platelike members in general. If the outside dimension of the gas generator is dispersed, therefore, the clearance between the pair of platelike members is dispersed after assembling of the gas generator, to result in gaps between the metal belt and the platelike members. In order to ensure the airtightness of the aforementioned space, therefore, it is necessary to suppress the dispersion in the outside dimension of the gas generator.

In order to manufacture the gas generator, however, various components constituting the housing of the gas generator must be variously worked by press working, caulking etc., and the outside dimension of the gas generator is dispersed by about ±0.3 mm. It is substantially impossible to completely eliminate this dispersion in the outside dimension, and hence it is necessary to take some countermeasure for absorbing the dispersion in the outside dimension of the gas generator.

Accordingly, an object of the present invention is to make it possible to precisely assemble a pair of platelike members with a desired clearance after assembling of a gas generator by taking countermeasure capable of absorbing dispersion in the outside dimension of the gas generator when the gas generator is vertically fixed by the pair of platelike members.

Means for Solving the Problem

A gas generator according to the present invention comprises ignition means, a gas generating agent ignited by the aforementioned ignition means for generating gas by combustion and a housing including a gas generating agent storage chamber filled with the aforementioned gas generating agent while the aforementioned housing is vertically held and fixed by a pair of platelike members arranged in parallel with each other. The gas generator according to the present invention comprises a deformable area to be deformed in a direction for decreasing the vertical outside dimension of the gas generator when the housing is fixed by the pair of platelike members.

Thus, the deformable area to be deformed for decreasing the vertical outside dimension of the gas generator when the gas generator is fixed by the pair of platelike members is so provided on the gas generator that this deformable area is deformed to absorb dispersion in the outside dimension of the gas generator in assembling, whereby a clearance between the pair of platelike members can be adjusted to a desired size after the assembling.

In the aforementioned gas generator according to the present invention, at least either a top plate or a bottom plate vertically located on the aforementioned housing preferably includes an outwardly protruding projection, and this projection preferably constitutes the aforementioned deformable area.

According to this structure, the deformable area can be easily formed by press working or the like. Further, the projection provided to outwardly protrude from the housing is so deformed as to absorb dispersion in the outside dimension of the gas generator, whereby breakage of internal components resulting from deformation of the housing can also be prevented.

In the aforementioned gas generator according to the present invention, the aforementioned projection is preferably provided on a part of the aforementioned housing partitioning/forming the aforementioned gas generating agent storage chamber.

According to this structure, other internal components such as the ignition means can be prevented from breakage when not only the projection but also the housing around the projection is deformed by any chance.

In the aforementioned gas generator according to the present invention, at least either a top plate or a bottom plate vertically located on the aforementioned housing preferably includes a protrusion having an outwardly protruding top face of a prescribed size, and the aforementioned deformable area is preferably constituted of a part, enclosing the aforementioned protrusion, of the aforementioned top plate or the aforementioned bottom plate provided with this protrusion.

According to this structure, the deformable area can be easily formed by press working or the like. Further, force applied to the gas generator in assembling is dispersed by the aforementioned top face, whereby the gas generator is prevented from breakage.

In the aforementioned gas generator according to the present invention, the aforementioned protrusion is preferably formed by press working, and the upper end of the aforementioned ignition means is preferably inserted into and positioned on a recess formed on the inner surface of the aforementioned housing by the aforementioned press working.

According to this structure, the deformable area and the recess for positioning the ignition means can be simultaneously formed by single press working, whereby manufacturing steps can be simplified.

The aforementioned gas generator according to the present invention preferably further comprises a combustion control member located between the aforementioned ignition means and the aforementioned gas generating agent storage chamber for supplying directivity to a flame formed in the aforementioned ignition means, the aforementioned protrusion is preferably formed by press working, the upper end of the aforementioned combustion control member is preferably inserted into a recess formed on the inner surface of the aforementioned housing by the aforementioned press working, and the aforementioned ignition means is preferably inserted into and positioned in the aforementioned combustion control member.

According to this structure, the upper end of the combustion control member is previously inserted into the recess provided on the housing in a step of manufacturing the gas generator so that no gas generating agent enters a space for arranging the ignition means when the gas generating agent storage chamber is filled with the gas generating agent, whereby the ignition means can be easily positioned and mounted.

The aforementioned gas generator according to the present invention preferably further comprises an elastic member located on the outer surface of at least either a top plate or a bottom plate vertically located on the aforementioned housing, and this elastic member preferably constitutes the aforementioned deformable area.

Thus, the clearance between the pair of platelike members can be ensured to a desired size also by separately providing the elastic member on the outside of the housing. According to this structure, the elastic member is deformed in assembling thereby absorbing dispersion in the outside dimension of the gas generator, whereby the housing is not deformed and the internal components are not broken.

EFFECT OF THE INVENTION

According to the present invention, a clearance between a pair of platelike members is precisely ensured also after the pair of platelike members are assembled into a gas generator.

DESCRIPTION OF REFERENCE SIGNS 1A to 1C gas generator, 10 igniter, 11 base part, 12 squib cup, 13, 14 header pin, 20 holder, 21, 22 holding part, 23 flange part, 24 caulking part, 30 combustion control cover, 31 large-diametral part, 32 small-diametral part, 33 slit, 40 AC cup, 41 side wall, 42 top plate, 43 collar part, 44 recess, 45 projection, 46 protrusion, 47 part (enclosing protrusion), 48 groove part, 50 gas generating agent, 61 O-ring, 62 sealing material, 63 gasket, 71, 72 platelike member, 73 metal band, 74 space (defined by a pair of plate members and metal band).

BEST MODES FOR CARRYING OUT THE INVENTION

Embodiments of the present invention are now described in detail with reference to the drawings.

First Embodiment

Figure 1:
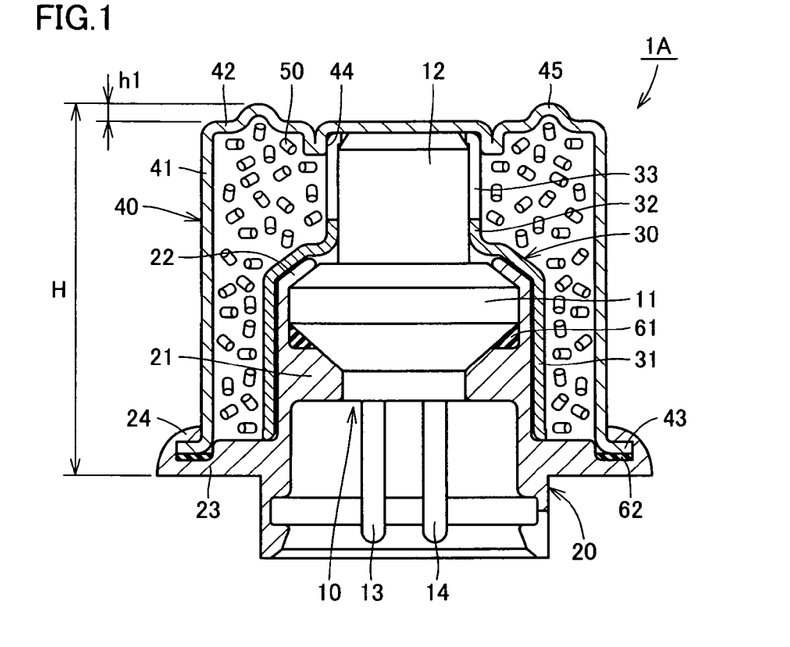
FIG. 1 is a schematic sectional view of a gas generator according to a first embodiment of the present invention.
Figure 2:
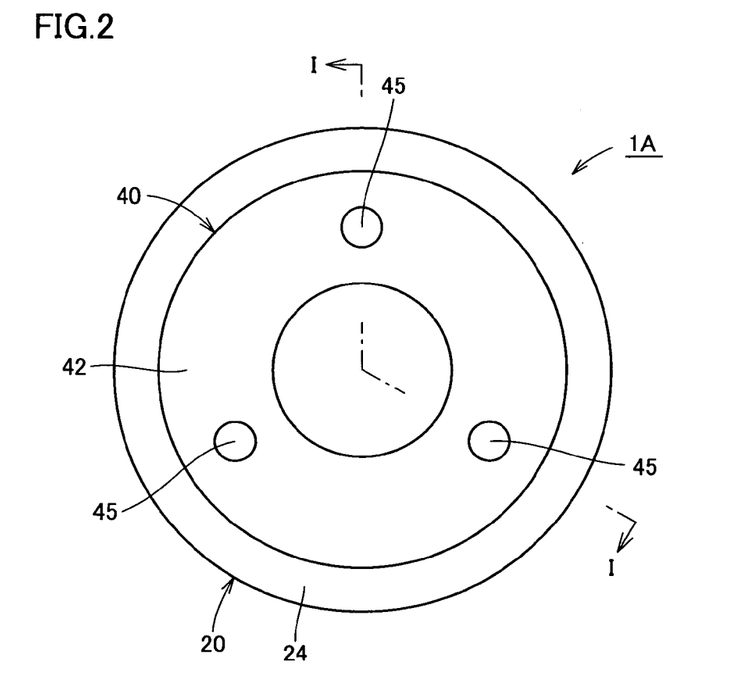
FIG. 2 is a plan view of the gas generator according to the first embodiment of the present invention.

FIG. 1 is a schematic sectional view of a gas generator according to a first embodiment of the present invention. FIG. 2 is a plan view of the gas generator according to the first embodiment of the present invention. The schematic sectional view shown in FIG. 1 is a schematic sectional view in a case of cutting the gas generator along the line I-I in FIG. 2.

As shown in FIG. 1, a gas generator 1A according to this embodiment mainly comprises an igniter (squib) 10 serving as ignition means, a holder 20 constituting part of a housing, a combustion control cover 30 assembled into the housing, an actuating charge cup (AC cup) 40 constituting the remaining part of the housing and a gas generating agent 50 filled into a prescribed area of the housing.

Igniter 10 is an ignition device for generating a flame, and includes an unillustrated priming and an unillustrated resistor for burning the priming therein. More specifically, igniter 10 includes a base 11 or a header in base 11 receiving/holding a pair of header pins 13 and 14 and a squib cup 12 mounted on base 11 or the header, while a resistor (bridge wire) is mounted to couple the forward ends of header pins 13 and 14 inserted into squib cup 12, and the priming is filled into squib cup 12 to enclose this resistor or to come into contact with this resistor. A Nichrome wire or the like is employed as the resistor in general, while ZPP (zirconium potassium perchlorate), ZWPP (zirconium tungsten potassium perchlorate) or lead tricyanate is employed as the priming in general. Squib cup 12 is made of a metal or plastic in general. Squib cup 12 may be filled not only with the priming but also with an inflammation agent in addition thereto.

When a collision is sensed, a prescribed quantity of current flows to the resistor through header pins 13 and 14. Joule heat is generated in the resistor due to the prescribed quantity of current flowing to the resistor, so that the priming starts combustion. A high-temperature flame (gas and particles) resulting from the combustion bursts squib cup 12 storing the priming, and ignites gas generating agent 50. The time from the flowing of the current to the resistor up to working of the ignition device is not more than 2 milliseconds if a Nichrome wire is employed for the resistor.

Holder 20 holds the aforementioned igniter 10. Holder 20, formed by a substantially cylindrical hollow member, is constituted of a molding prepared from an aluminum alloy or the like, for example. Holder 20 includes holding parts 21 and 22 holding base 11 of igniter 10 by vertically putting the same therebetween and a flange part 23 serving as a coupling part with the AC cup. An O-ring 61 is interposed between holding part 22 of holder 20 and base 11 of igniter 10. This O-ring 61 is a member for hermetically sealing gaps formed between base 11 of igniter 10 and holding parts 21 and 22 of the aforementioned holder 20 when the former is caulked/fixed by the latter and for hermetically sealing a gas generating agent storage chamber. That of a material sufficient in heat resistance and durability is preferably employed as O-ring 61, and an O-ring of EPDM resin, which is a kind of ethylene propylene rubber, or the like is preferable, for example. Hermetic performance is further improved when a sealing agent is separately applied to this portion.

A combustion control cover 30 serving as a combustion control member is externally set on flange part 23 of holder 20, to be located between igniter 10 and the gas generating agent storage chamber. Combustion control cover 30 is formed by a substantially cylindrical hollow member, and has a large-diametral part 31 covering the upper portion of holder 20 and a small-diametral part 32 covering squib cup 12 of igniter 10. Combustion control cover 30 prevents fragments resulting from bursting of squib cup 12, supplies directivity to the flame formed in the igniter 10 and controls the flame to transversely induce the same toward the gas generating agent storage chamber filled with gas generating agent 50.

A plurality of slits 33 are vertically provided on small-diametral part 32 of combustion control cover 30. These slits 33 supply a passage to the flame spurting out while blustering the side wall of squib cup 12. The flame spurting from squib cup 12 transversely spurts through slits 33 due to this function of slits 33, for burning gas generating agent 50.

AC cup 40 is attached to flange part 23 of holder 20. AC cup 40, formed by a bottomed cylindrical member, is attached to holder 20 to cover igniter 10 supported by holder 20 and combustion control cover 30 externally set on holder 20. More specifically, AC cup 40 includes a side wall 41 and a top plate 42, for partitioning/forming the gas generating agent storage chamber filled with gas generating agent 50 by side wall 41 and part of top plate 42.

A collar part 43 is formed on the lower end of side wall 41 of AC cup 40, and this collar part 43 is caulked/fixed by flange part 23 and a caulking part 24 of holder 20. A sealing agent 62 is applied between flange part 23 of holder 20 and collar part 43 of AC cup 40. This sealing agent 62, which is not essential, is applied in order to reliably hermetically seal the space between flange part 23 of holder 20 and collar part 43 of AC cup 40 as the need arises. Employment of a material having low moisture permeability and excellent durability is preferable for sealing agent 62, and a silicon-based sealing agent is preferably employed, for example. In a case of employing a sealing agent prepared by dissolving a solid component in a solvent, the housing may be caulked/fixed after application/drying of the sealing agent.

A recess 44 is formed around the center of the inner surface of top plate 42 of AC cup 40 by press working. The upper end of igniter 10 and that of combustion control cover 30 are inserted into this recess 44, thereby positioning AC cup 40 with respect to holder 20.

The gas generating agent storage chamber partitioned/formed by AC cup 40, holder 20 and combustion control cover 30 is filled with gas generating agent 50. Gas generating agent 50 ignites and burns due to the high-temperature flame introduced through slits 33 of the aforementioned combustion control cover 30. Side wall 41 of AC cup 40 bursts by the pressure of combustion gas of this gas generating agent 50, so that gas generating agent 50 and combustion products thereof are derived from gas generator 1A.

In order to obtain a gas generator of a prescribed output, it is necessary that AC cup 40 reliably bursts with a prescribed pressure. Therefore, scores (dents) are formed by press working or the like in a prescribed shape so that the remaining thickness of side wall 41 reaches a prescribed level. Thus, side wall 41 of AC cup 40 bursts when the internal pressure of the gas generating agent storage chamber reaches a prescribed level, so that the gas generator implements a desired stable output. While about one to 10-odd scores are provided in general, about 2 to 8 in general, or preferably about 2 to 6 scores are provided since gas nonuniformly spurts if the number of the scores is too small while side wall 41 too easily bursts if the number of the scores is too large.

In gas generator 1A according to this embodiment, AC cup 40 is made of an aluminum alloy, the shape of the scores is parallelized in the vertical direction (axial direction), and the remaining thickness of the scores is designed/manufactured to 0.3 mm. In this case, side wall 41 of AC cup 40 bursts with an internal pressure of about 8 MPa within a prescribed pressure range of 6 MPa to 10 MPa, so that a stable output of the gas generator is obtained.

Gas generating agent 50 filled into the gas generating agent storage chamber ignites due to the flame supplied from igniter 10 and is derived from the gas generator along with gas resulting from combustion, as hereinabove described. A molding of smokeless powder (cellulose nitrate) or a molding of non-azide-based composition consisting of an organonitrogen compound and an oxidizer is employed as gas generating agent 50. In recent years, non-nitrocellulosic gas generating agent generating an extremely small amount of noxious component such as carbon monoxide has been employed as a gas generating agent for a pretensioner of a seat belt apparatus.

Any shape such as a granular, pelletlike, cylindrical or discoidal shape is employed as the shape of the molding of gas generating agent 50. Alternatively, a porous (macaroni-shaped or lotus root-shaped, for example) molding having holes therein is also employed. This shape is properly selected in response to the specification of a unit into which the gas generator is assembled, and the optimum shape is so selected that the rate of gas generation varies in combustion of the gas generating agent, for example. The size of the molding is properly selected in consideration of the linear burning rate, the pressure index etc. of the gas generating agent in addition to the shape of the gas generating agent. The loading weight of the gas generating agent, properly varied with the specification of the unit into which the gas generator is assembled, is set to about 0.2 grams to 2.0 grams in general when smokeless powder is used.

As shown in FIGS. 1 and 2, gas generator 1A according to this embodiment has outwardly protruding projections 45 on prescribed positions of top plate 42 of AC cup 40 partially forming the housing. These projections 45 correspond to deformable areas to be deformed to decrease the vertical outside dimension of gas generator 1A when fixed by a pair of platelike members described later. The vertical outside dimension of gas generator 1A, corresponding to the outside dimension of a part held between the pair of platelike members described later, is defined between the lower surface of flange part 23 of holder 20 and the forward ends of projections 45 provided on top plate 42 of AC cup 40, and expressed in a height H shown in FIG. 1. As hereinabove described, gas generator 1A is manufactured with dispersion of the outside dimension in the range of about ±0.3 mm with respect to a planned dimension due to a reason in manufacturing.

Projections 45 are formed by press working, for example, to protrude from other regions of top plate 42 with a prescribed height h1. In gas generator 1A according to this embodiment, projections 45 are provided on three portions while circumferentially aligning on a part of top plate 42 of AC cup 40 partitioning/forming the gas generating agent storage chamber.

Figure 3:
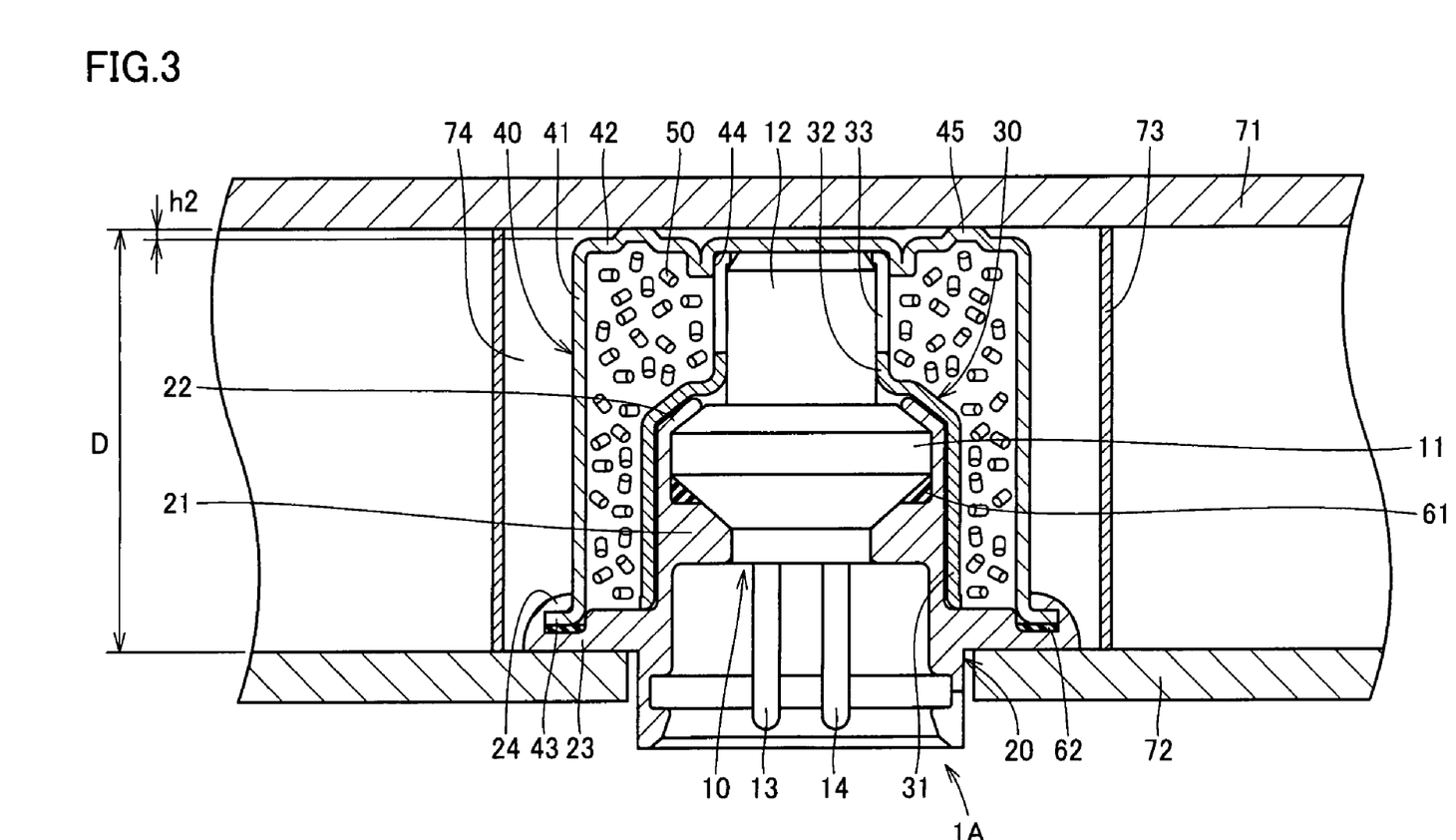
FIG. 3 is a schematic sectional view of a seat belt windup unit showing a state after fixing the gas generator according to the first embodiment of the present invention to hold the same with a pair of platelike members.

FIG. 3 is a schematic sectional view of a seat belt windup unit showing a state after fixing the gas generator according to this embodiment to hold the same with the pair of platelike members. As shown in FIG. 3, gas generator 1A is vertically held and fixed by a pair of parallelly arranged platelike members 71 and 72. A metal band 73 is arranged on a side of gas generator 1A to enclose gas generator 1A, and the upper and lower ends of metal band 73 are in contact with pair of platelike members 71 and 72. Thus, gas generator 1A is assembled into a space 74 defined by pair of platelike members 71 and 72 and metal band 73.

In assembling, gas generator 1A is so placed that the lower surface of flange part 23 is in contact with the main surface of lower platelike member 72, and held by upper platelike member 71 along with metal band 73 arranged to enclose gas generator 1A. Lower platelike member 72 and upper platelike member 71 are clamped to approach to each other by unillustrated clamp means, so that gas generator 1A is assembled into the unit.

Projections 45 provided on AC cup 40 is plastically deformed due to this clamping and crush into the shape shown in FIG. 3 so that the height of projections 45 vertically shrinks due to the deformation and changes from the height h1 to a height h2. Thus, a clearance between pair of platelike members 71 and 72 can be adjusted to be identical to the vertical height D of metal band 73 without breaking gas generator 1A, by adjusting the degree of clamping with the clamp means. In other words, dispersion in the outside dimension of gas generator 1A can be absorbed due to deformation of projections 45, so that the clearance between pair of platelike members 71 and 72 can be adjusted to a prescribed size after assembling of gas generator 1A. Consequently, airtightness of space 74 enclosing gas generator 1A can be maintained high, and a seat belt apparatus having a pretensioner function of desired performance can be manufactured with a high yield.

In gas generator 1A according to this embodiment, projections 45 absorbing dispersion in the outside dimension of the housing can be simply formed by press working, not to stress the manufacturing cost. Further, projections 45 are formed on the housing in the part partitioning/forming the gas generating agent storage chamber as in gas generator 1A according to this embodiment so that the remaining internal components such as igniter 10 are not broken when not only projections 45 but also the housing around the projections are deformed by any chance.

In this embodiment, it is important that the outside dimension H of manufactured gas generator 1A is designed to necessarily slightly exceed the vertical height D of metal band 73. This is because there is a possibility that gas generator 1A is not held/fixed by pair of platelike members 71 and 72 also when platelike members 71 and 72 are clamped to the desired clearance such that gas generator 1A wobbles after the assembling and the airtightness of the aforementioned space 74 is not ensured if gas generator 1A is not designed in the aforementioned manner.

Second Embodiment

Figure 4:
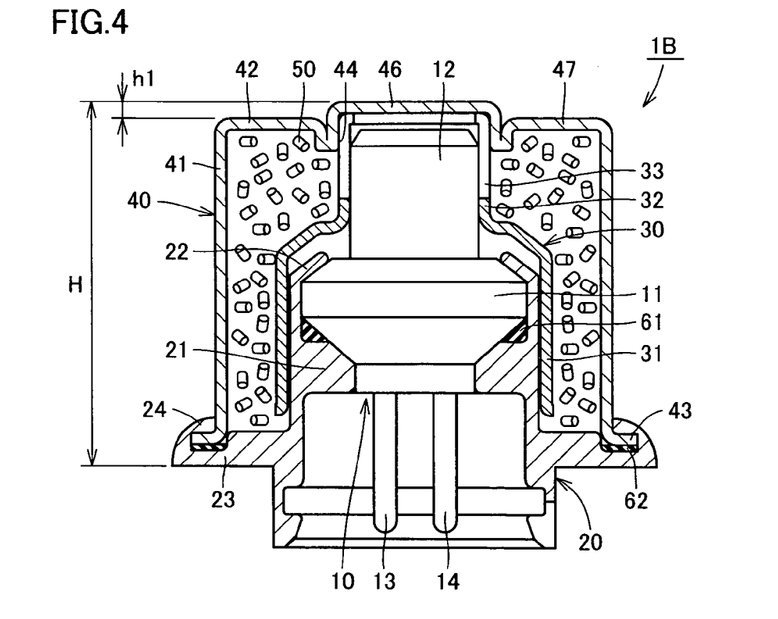
FIG. 4 is a schematic sectional view of a gas generator according to a second embodiment of the present invention.
Figure 5:
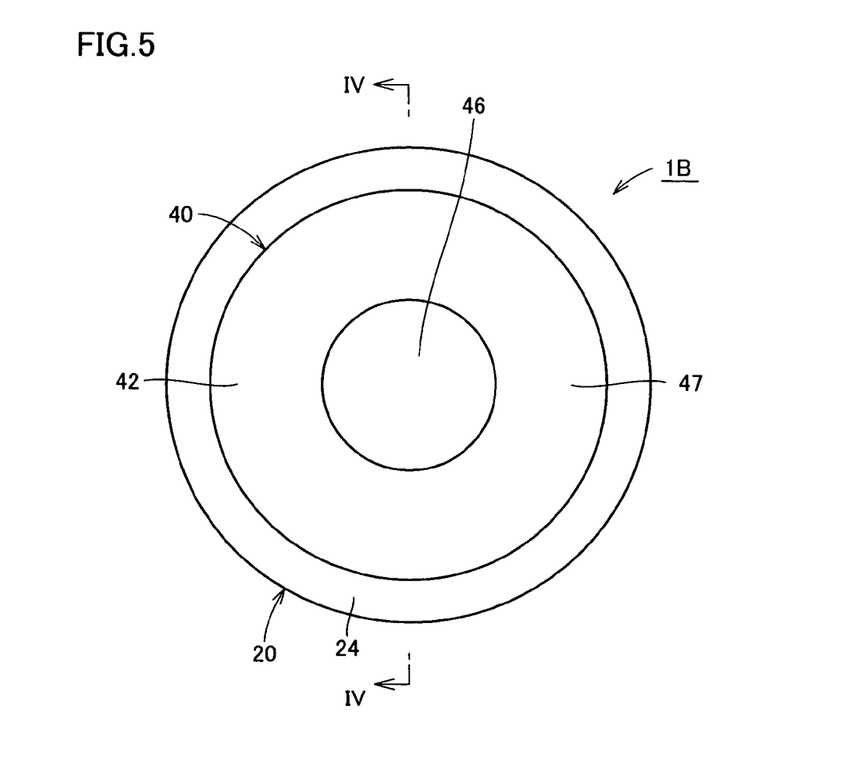
FIG. 5 is a plan view of the gas generator according to the second embodiment of the present invention.

FIG. 4 is a schematic sectional view of a gas generator according to a second embodiment of the present invention. FIG. 5 is a plan view of the gas generator according to the second embodiment of the present invention. Parts similar to those of gas generator 1A according to the aforementioned first embodiment are denoted by the same reference numerals in the figures, and redundant description is not repeated. The schematic sectional view shown in FIG. 4 is a schematic sectional view in a case of cutting the gas generator along the line IV-IV in FIG. 5.

As shown in FIGS. 4 and 5, a gas generator 1B according to this embodiment has a structure mostly similar to that of gas generator 1A according to the aforementioned first embodiment, and is different in a point that the shape of a top plate 42 of an AC cup 40 is different and in a point that the shape of a combustion control cover 30 is different. Gas generator 1B according to this embodiment has a protrusion 46 including a top face having an area of a prescribed size on a prescribed position of top plate 42 of AC cup 40. Protrusion 46 protrudes with a prescribed height h1 with respect to another part 47 of top plate 42 located to enclose this protrusion 46. This protrusion 46 is formed by press working, for example, and a recess 44 is formed on the inner surface of top plate 42 as a result. The upper end of an igniter 10 and the upper end of combustion control cover 30 are inserted into this recess 44, thereby positioning AC cup 40 with respect to a holder 20. Gas generator 1B has clearances of a prescribed height between combustion control cover 30 and a holding part 22 of holder 20 and between combustion control cover 30 and a flange part 23 of holder 20. These clearances are preferably formed with a height substantially identical to the height h1 of the aforementioned protrusion 46.

Figure 6:
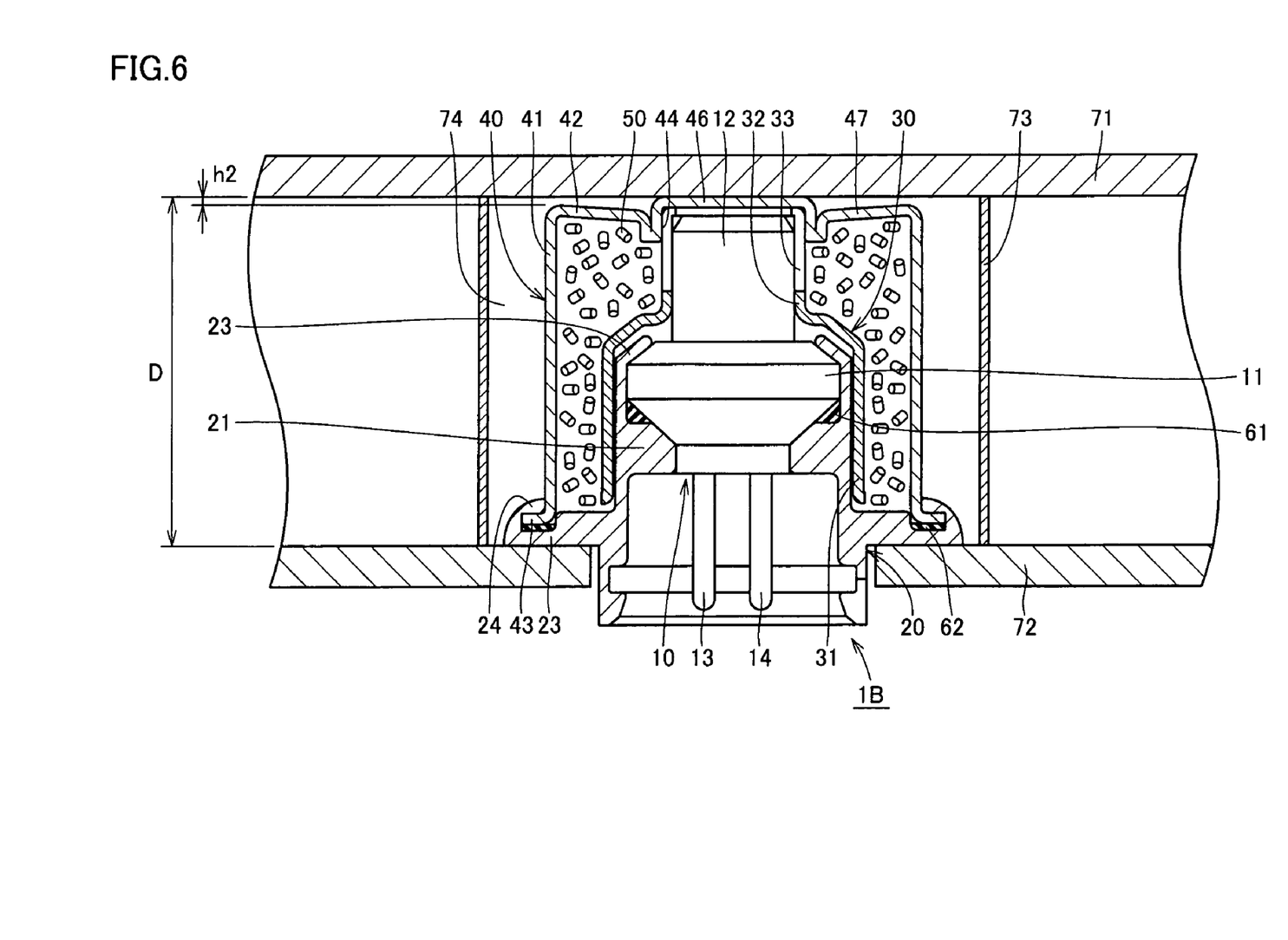
FIG. 6 is a schematic sectional view of a seat belt windup unit showing a state after fixing the gas generator according to the second embodiment of the present invention to hold the same with a pair of platelike members.

FIG. 6 is a schematic sectional view of a seat belt windup unit showing a state after fixing the gas generator according to this embodiment to hold the same with a pair of platelike members. In assembling, gas generator 1B is so placed that the lower surface of flange part 23 is in contact with the main surface of a lower platelike member 72, and held by an upper platelike member 71 along with a metal band 74 arranged to enclose gas generator 1B, as shown in FIG. 6. Lower platelike member 72 and upper platelike member 71 are clamped to approach to each other by unillustrated clamp means, so that gas generator 1B is assembled into the unit.

Protrusion 46 provided on AC cup 40 is pressed downward due to this clamping, and the other part 47 of top plate 42 located to enclose protrusion 46 is plastically deformed or elastically deformed to crush into the shape shown in FIG. 6, so that protrusion 46 moves downward due to the deformation of the other part 47 of top plate 42 located to enclose the aforementioned protrusion 46 and changes from the height h1 to a height h2. While combustion control cover 30 is also pressed downward along with protrusion 46 due to this clamping, the clearances are so provided between combustion control cover 30 and holding part 22 of holder 20 and between combustion control cover 30 and flange part 23 of holder 20 that the remaining internal components such as an igniter 10 are not broken.

Thus, the clearance between pair of platelike members 71 and 72 can be adjusted to be identical to the vertical height D of a metal band 73 without breaking gas generator 1B, by adjusting the degree of clamping with the clamp means. In other words, dispersion in the outside dimension of gas generator 1B can be absorbed due to deformation of the other part 47 of top place 42 located to enclose protrusion 46, and the clearance between pair of platelike members 71 and 72 can be adjusted to a desired size after assembling of gas generator 1B. Consequently, airtightness of a space 74 enclosing gas generator 1B can be maintained high, and a seat belt apparatus having a pretensioner function of desired performance can be manufactured with a high yield.

In gas generator 1B according to this embodiment, part 47 absorbing dispersion in the outside dimension of a housing can be simply formed by press working, not to stress the manufacturing cost. Further, force applied to gas generator 1B in assembling is dispersed by the top face of protrusion 46, whereby the gas generator is prevented from breakage.

In this embodiment, it is important that the outside dimension H of manufactured gas generator 1B is designed to necessarily slightly exceed the vertical height D of metal band 73. This is because there is a possibility that gas generator 1B is not held/fixed by pair of platelike members 71 and 72 also when platelike members 71 and 72 are clamped to the desired clearance, gas generator 1B wobbles after the assembling and the airtightness of the aforementioned space 74 is not ensured if gas generator 1B is not designed in the aforementioned manner.

Third Embodiment

Figure 7:
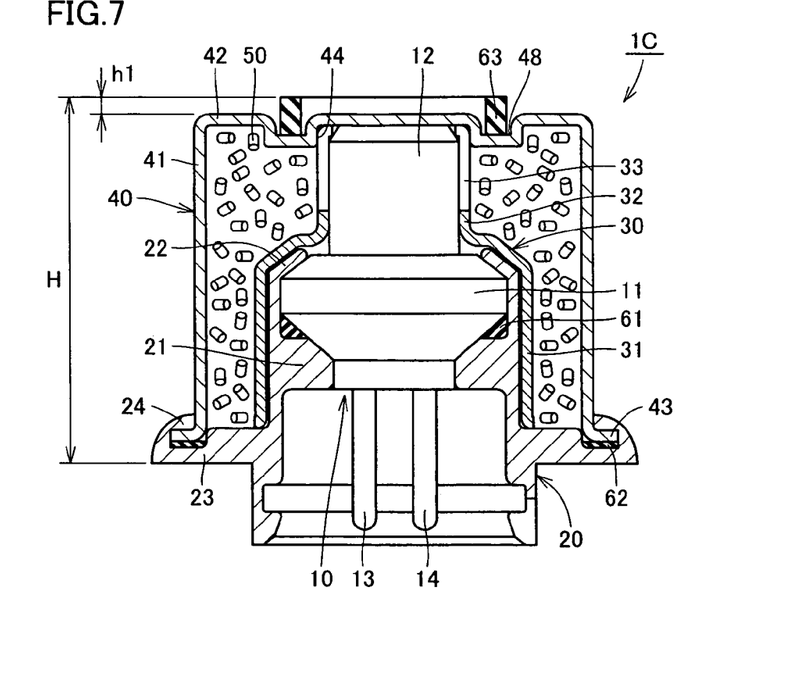
FIG. 7 is a schematic sectional view of a gas generator according to a third embodiment of the present invention.
Figure 8:
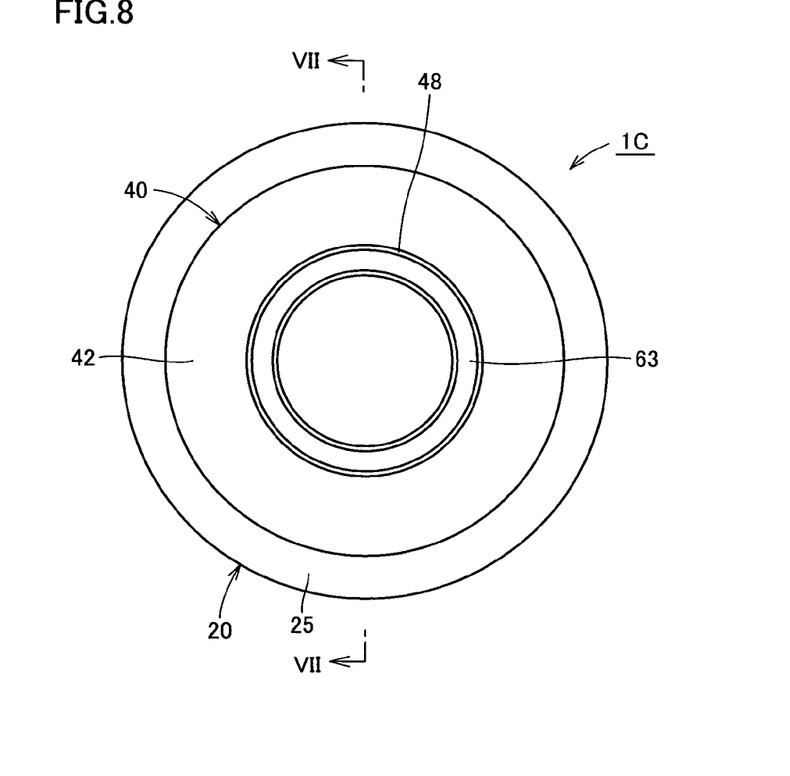
FIG. 8 is a plan view of the gas generator according to the third embodiment of the present invention.

FIG. 7 is a schematic sectional view of a gas generator according to a third embodiment of the present invention. FIG. 8 is a plan view of the gas generator according to the third embodiment of the present invention. Parts similar to those of gas generator 1A according to the aforementioned first embodiment are denoted by the same reference numerals in the figures, and redundant description is not repeated. The schematic sectional view shown in FIG. 7 is a schematic sectional view in a case of cutting the gas generator along the line VII-VII in FIG. 8.

As shown in FIGS. 7 and 8, a gas generator 1C according to this embodiment has a structure mostly similar to that of gas generator 1A according to the aforementioned first embodiment, and is different only in a point that the shape of a top plate 42 of an AC cup 40 and presence/absence of a gasket 63 which is an elastic member located on the outer surface of top plate 42 of AC cup 40 are different. Gas generator 1C according to this embodiment has an annular groove 48 on a prescribed position of top plate 42 of AC cup 40, and gasket 63 is so attached that part thereof is inserted into this groove 48. Gasket 63 is fixed to top plate 42 of AC cup 40 with an adhesive or the like, for example.

The upper surface of gasket 63 protrudes with a prescribed height h1 with respect to the top face of AC cup 40. The aforementioned groove 48 is formed by press working, for example, and a recess 44 is formed on the inner surface of top plate 42 as a result. The upper end of igniter 10 and the upper end of a combustion control cover 30 are inserted into this recess 40, thereby positioning AC cup 40 with respect to holder 20.

Figure 9:
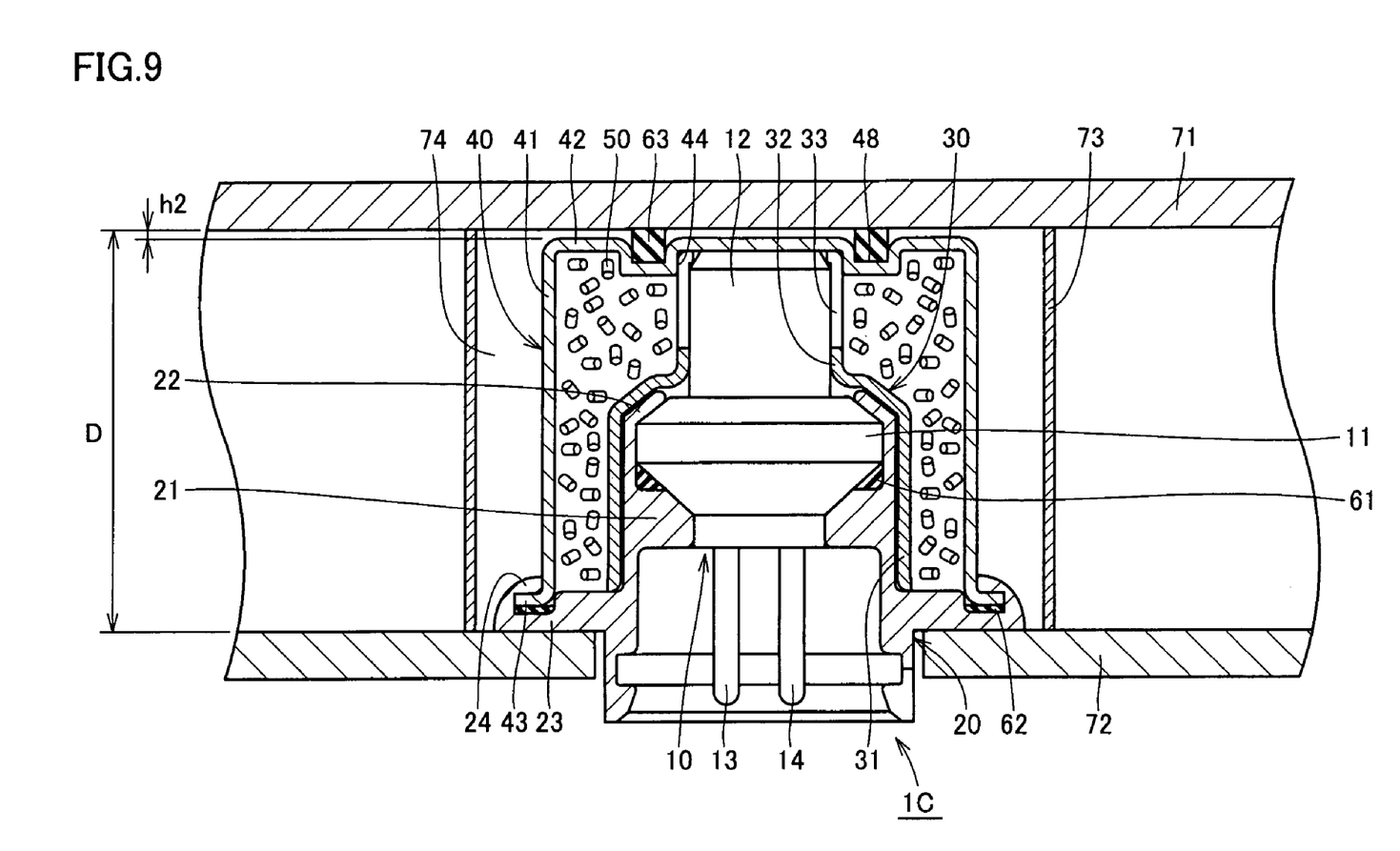
FIG. 9 is a schematic sectional view of a seat belt windup unit showing a state after fixing the gas generator according to the third embodiment of the present invention to hold the same with a pair of platelike members.

FIG. 9 is a schematic sectional view of a seat belt windup unit showing a state after fixing the gas generator according to this embodiment to hold the same with a pair of platelike members. In assembling, gas generator 1C is so placed that the lower surface of flange part 23 is in contact with the main surface of a lower platelike member 72, and held by an upper platelike member 71 along with a metal band 74 arranged to enclose gas generator 1C, as shown in FIG. 9. Lower platelike member 72 and upper platelike member 71 are clamped to approach to each other by unillustrated clamp means, so that gas generator 1C is assembled into the unit.

Gasket 63 located on top plate 42 of AC cup 40 is elastically deformed due to this clamping to crush into the shape shown in FIG. 9, and the height between the top face of AC cup 40 and the upper surface of gasket 63 changes from h1 to h2. In other words, gasket 63 which is an elastic member forms a deformable area deformed to decrease the vertical outside dimension of gas generator 1C when fixed by pair of platelike members 71 and 72 in gas generator 1C according to this embodiment.

Thus, a clearance between pair of platelike members 71 and 72 can be adjusted to be identical to the vertical height D of metal band 73 without breaking gas generator 1C, by adjusting the degree of clamping with the clamp means. In other words, dispersion in the outer dimension of gas generator 1C can be absorbed due to deformation of gasket 63, and the clearance between pair of platelike members 71 and 72 after assembling of gas generator 1C can be adjusted to a desired size. Consequently, airtightness of a space 74 enclosing gas generator 1C can be maintained high, and a seat belt apparatus having a pretensioner function of desired performance can be manufactured with an excellent yield.

While the cases of providing both of the projections and the protrusion on the top plates of the AC cups constituting the housings have been illustrated in the aforementioned first and second embodiments, the protrusions or the projection can also be provided on the flange part of the holder constituting the housing. Also according to this structure, dispersion in the outside dimension of the housing of the gas generator can be absorbed on the lower surface of the housing, whereby a seat belt apparatus having a pretensioner function of high performance can be implemented. However, the lower platelike member is provided with an opening for avoiding a connector formed on the lower end of the gas generator, and hence hermetic treatment in this portion is separately required in the case of the aforementioned structure.

While the case of attaching the elastic member to the top face of the AC cup constituting the housing has been illustrated in the aforementioned third embodiment, the elastic member can also be attached to the lower surface of the flange part of the holder constituting the housing. Further, the elastic member may not necessarily be bonded/fixed to the housing but may be bonded/fixed to the main surfaces of the platelike members, or may not be particularly bonded/fixed but may simply be held by the platelike members and the housing of the gas generator. In any case, dispersion in the outside dimension of the housing of the gas generator can be absorbed through the elastic member, whereby a seat belt apparatus having a pretensioner function of high performance can be implemented.

Thus, the aforementioned embodiments disclosed this time are illustrative in all points, and not restrictive. The technical range of the present invention is defined by claims, and includes all modifications within the meaning and range equivalent to the description of claims.

The invention claimed is:

1. A gas generator, comprising:
    ignition means;
    a gas generating agent ignited by the ignition means to generate gas by combustion; and
    a housing including a gas generating agent storage chamber filled with the gas generating agent, the gas generating agent storage chamber being defined by the housing;
    wherein:
    the gas generator is configured to operate in and be held between a pair of plate members of a seat belt pretensioner apparatus, the plate members being arranged in parallel and respectively above and below the gas generator;
    the housing comprises a deformable area that is deformed to reduce a height of the gas generator when the gas generator is held between the pair of plate members; and
    the housing comprises at least one of a top plate and a bottom plate and the deformable area is provided on the at least one of the top plate and the bottom plate.

2. The gas generator according to claim 1, wherein:
    the deformable area comprises a plastic deformable area that is plastically deformed when the gas generator is held between the pair of plate members.

3. The gas generator according to claim 2, wherein:
    the at least one of the top plate and the bottom plate comprises an outwardly protruding projection; and
    the projection constitutes the plastic deformable area.

4. The gas generator according to claim 3, wherein:
    the projection is provided on a part of the housing defining the gas generating agent storage chamber.

5. The gas generator according to claim 3, wherein:
    the housing comprises an AC cup storing the gas generating agent and a holder having a flange part and a caulking part for fixing the AC cup on a periphery of the holder, for fixing the ignition means; and
    the projection is provided on a surface of the AC cup constituting the uppermost surface of the housing.

6. The gas generator according to claim 5, wherein:
    an inner surface of one of the pair of plate members contacts an outer, planar surface of the flange part; and
    an inner surface of the other one of the pair of plate members contacts the projection provided on the surface of the AC cup so that the gas generator is held and fixed by the pair of plate members.

7. The gas generator according to claim 6, wherein:
    the AC cup comprises a side surface for dispensing gas generated by combustion of the gas generating agent diametrally from the housing through an opening formed during combustion; and
    the side surface comprises at least one score extending in parallel with an axial direction of the housing, the at least one score forming a starting point for the opening.

8. The gas generator according to claim 1, wherein:
    the deformable area comprises an elastic deformable area that is elastically deformed when held and fixed by the pair of platelike members.

9. The gas generator according to claim 8, wherein:
    at least one of the top plate and the bottom plate comprises a protrusion including an outwardly protruding top face of a prescribed size; and
    a part of the at least one of the top plate and the bottom plate including the protrusion constitutes the elastic deformable area.

10. The gas generator according to claim 9, wherein:
    the protrusion is formed by press working; and
    an upper end of the ignition means is inserted into and positioned in a recess formed on an inner surface of the housing by the press working.

11. The gas generator according to claim 9, further comprising:
    a combustion control member located between the ignition means and the gas generating agent storage chamber for supplying directivity to a flame formed in the ignition means;
    wherein:
    the protrusion is formed by press working;
    an upper end of the combustion control member is inserted into a recess formed on an inner surface of the housing by the press working; and
    the ignition means is inserted into and positioned in the combustion control member.

12. The gas generator according to claim 9, wherein:
    the housing comprises an AC cup storing the gas generating agent and a holder comprising a flange part and a caulking part for fixing the AC cup on a periphery of the holder, for fixing the ignition means; and
    the protrusion is provided on a surface of the AC cup constituting the top plate of the housing.

13. The gas generator according to claim 12, wherein:
    an inner surface of one of the pair of plate members contacts an outer, planar surface of the flange part; and
    an inner surface of the other one of the pair of plate members contacts a top face of the protrusion provided on the surface of the AC cup so that the gas generator is held and fixed by the pair of plate members.

14. The gas generator according to claim 13, wherein:
    the AC cup comprises a side surface for dispensing gas generated by combustion of the gas generating agent diametrally from the housing through an opening formed during combustion; and
    the side surface comprises at least one score extending in parallel with an axial direction of the housing, the at least one score forming a starting point for the opening.

15. The gas generator according to claim 8, further comprising:
    an elastic member located on an outer surface at least one of the top plate and the bottom plate;
    wherein the elastic member constitutes the elastic deformable area.

* * * * *